Oct. 11, 1960  E. P. KRAJEWSKI  2,955,648
POP-UP ARM REST
Filed Dec. 23, 1958  2 Sheets-Sheet 1

INVENTOR
EDWARD P. KRAJEWSKI
BY [signature]
ATTORNEY

Oct. 11, 1960     E. P. KRAJEWSKI     2,955,648
POP-UP ARM REST
Filed Dec. 23, 1958                                2 Sheets-Sheet 2
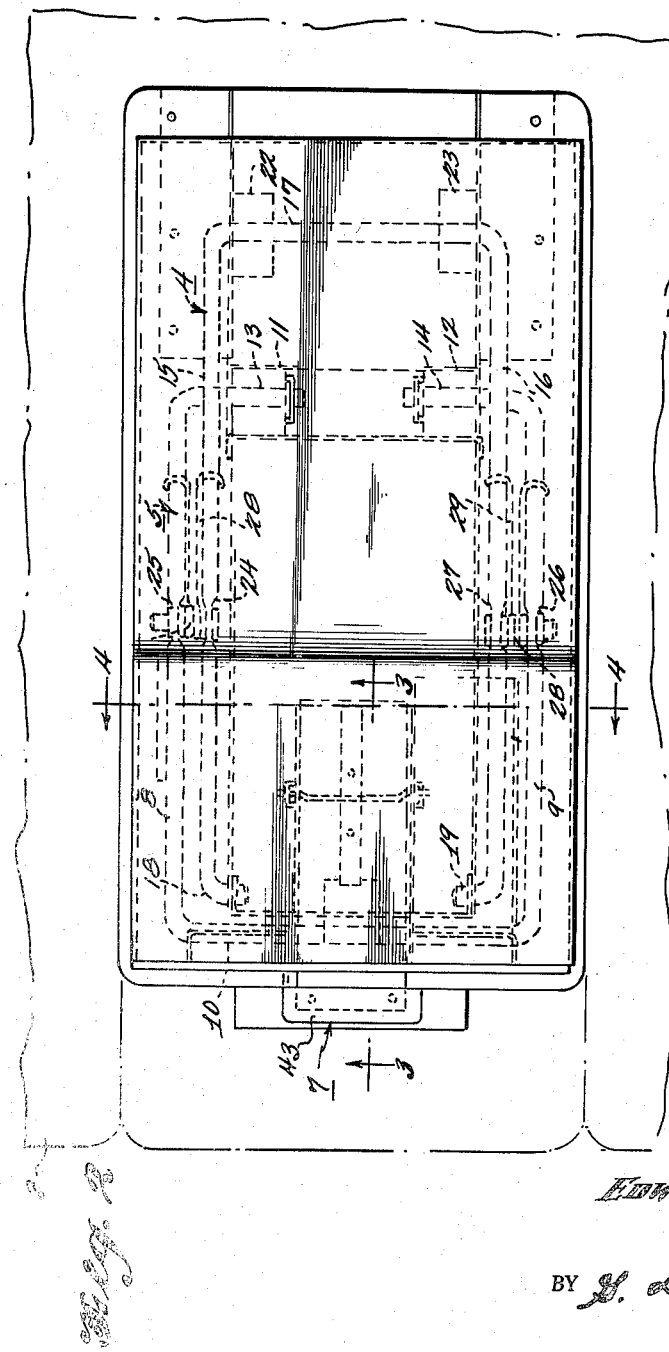
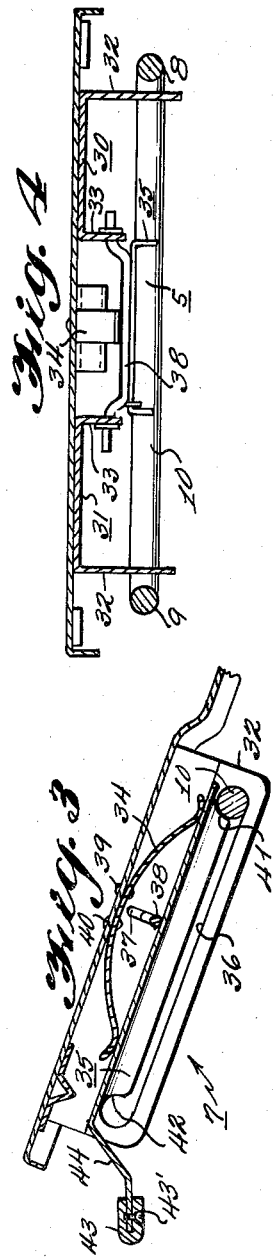
INVENTOR
EDWARD P. KRAJEWSKI
BY
ATTORNEY United States Patent Office 2,955,648
Patented Oct. 11, 1960

2,955,648
POP-UP ARM REST

Edward P. Krajewski, Detroit, Mich., assignor to General Motors Corporation, Detroit, Mich., a corporation of Delaware Filed Dec. 23, 1958, Ser. No. 782,443

3 Claims. (Cl. 155—198)

The present invention relates to an adjustable arm rest and more particularly to a latching mechanism for locking an adjustable arm rest in its raised or lowered position.

Many present day automobiles having seats that accommodate three people have an adjustable arm rest intermediate the ends of the seat. This arm rest when not raised is in a lowered position, and is substantially flush with the seat cushions at the sides thereof. The purpose of this arm rest is to provide a comfortable arm support when only one or two persons are sitting on the seat. The problem arises, however, in positively maintaining the arm rest in an erected position when it is raised by the person occupying the seat and also in preventing the arm rest, while it is in a lowered position, from rising above the level of the adjacent seats so as to cause an obstruction.

Accordingly, the objects of this invention are: to provide a latching mechanism that will lock a collapsible arm rest when it is in a raised position; to maintain the arm rest in a fixed position when it is lowered; to provide a latching mechanism that is readily accessible by the occupants of a seat for moving the arm rest from a lowered to a raised position and from a raised to a lowered position; to provide a latching mechanism having a hand lock release that is movable in the same direction as the arm rest; to provide a latching mechanism having a minimum vertical height so that it can be disposed beneath the arm rest and not cause any obstruction when the arm rest is lowered into its receiving well.

Referring now to the drawings—

Fig. 2 is a plane view taken on lines 2—2 of Fig. 1.

Fig. 3 is a sectional view of the present invention taken on lines 3—3 of Fig. 2.

Fig. 4 is an elevation view of the present invention taken on lines 4—4 of Fig. 2.

Figure 1:
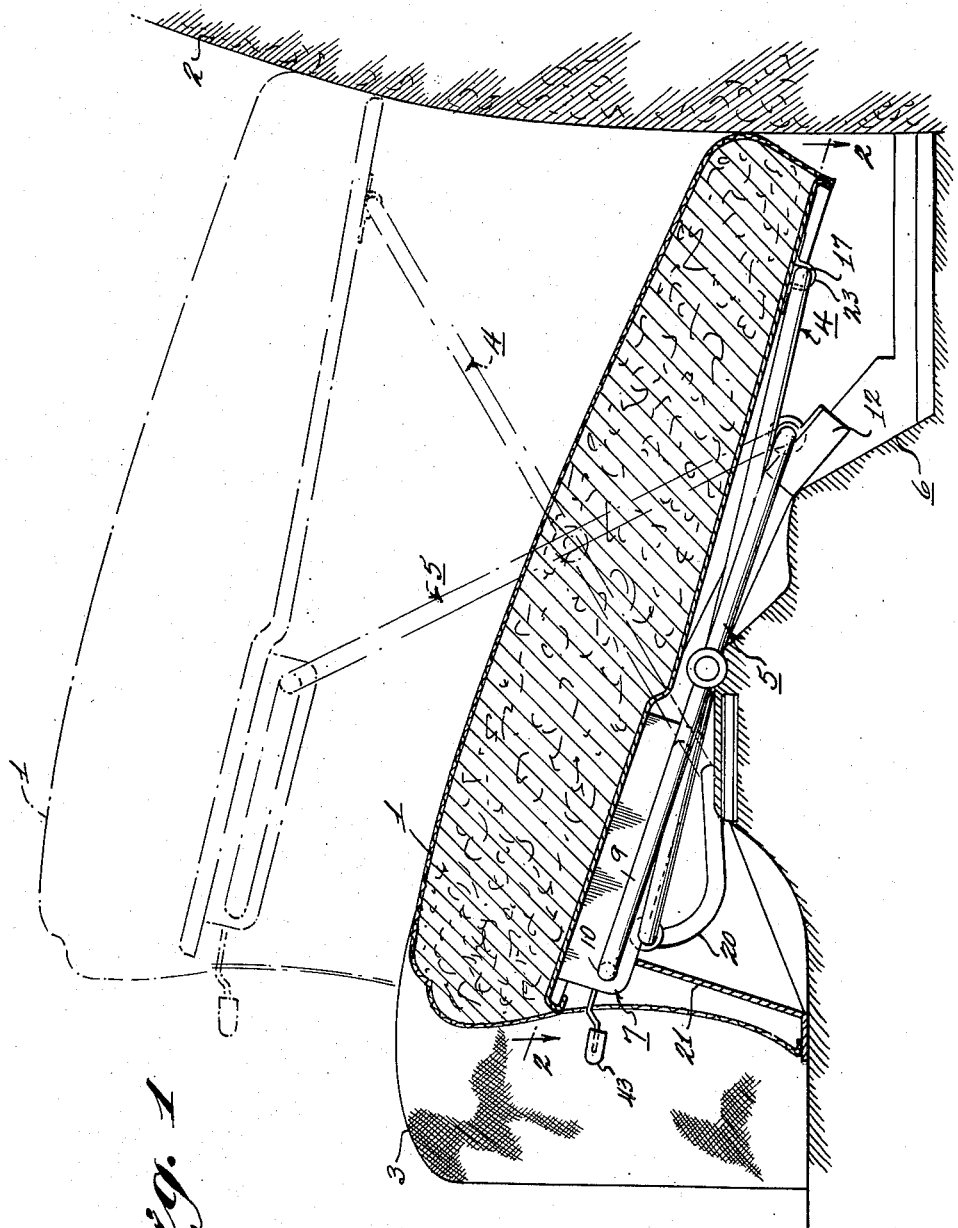
Fig. 1 is an elevation view showing an arm rest incorporating the present invention.

Referring now to Fig. 1 of the drawings, an arm rest generally indicated as 1 is shown incorporated with a rear seat of an automobile which comprises a back rest 2 and a seating portion 3. The arm rest 1 is shown in its lowered position being supported by support links 4 and 5 that are pivotally mounted by suitable brackets and guide supports to a base or floor 6 of the automobile. The latching mechanism generally indicated as 7, which is the subject of the present invention, is shown disposed beneath the arm rest 1. A hand release member 8 is incorporated with the latching mechanism 7 for releasing the locking means thereof, which will hereafter be explained, so as to permit the arm rest 1 to rise to a position indicated by the dash lines.

More specifically, the supporting mechanism of the arm rest 1 comprises a support link 5 having substantially longitudinal parallel legs 8 and 9 integrally joined to a transverse member 10. Support brackets 11 and 12, which are fixedly secured to the base or floor 6 of the automobile, are adapted to pivotally house the inwardly extending end portions 13 and 14 of the link 5. In general, the supporting link 5 is in the form of a U, with the arms of the U constituting the longitudinal legs 8 and 9, and the connecting base being the transverse portion 10. The transverse bar 10 of the link 5 is adapted to be received by the latching mechanism 7, in a manner which will hereafter be explained. The other supporting link 4 has a configuration similar to that of link 5 and also has substantially parallel legs 15, 16 integrally joined to a transverse bar 17. The ends 18 and 19 of the legs 15 and 16, respectively, are twisted inwardly at substantially right angles and are carried by guide slots 20 which are provided in a pair of spaced support plates 21 fixedly secured to the floor 6 of the automobile. The guide slots 20 are curved as illustrated in Figure 1 so as to guide the ends 18 and 19 of the link 4 and in turn the arm rest 1 when it is being raised or lowered. The transverse bar portion 17 of the link 4 is pivotally carried by the support brackets 22 and 23 which are secured by suitable fasteners to the arm rest 1.

Links 4 and 5 have crimped portions 24, 25, 26, and 27 on the longitudinal portions thereof located substantially intermediate the ends of the longitudinal legs. Bores, which are not shown, are provided in the crimped portions for receiving a suitable fastener that secures the links 4 and 5 together in a scissor manner and permits them to work together. Torsion springs 28 and 29 are interposed between the legs of the supporting links 4 and 5 and are wound about the link fasteners as illustrated. Each torsion spring has two outwardly extending arms that have ends bent to conform to the shape of the legs of the links. One of the ends of the spring arm biases the leg of link 4 and the other biases the leg of link 5. The purpose of torsion springs 28 and 29 is to provide a separating force to the links 4 and 5 so that when the locking member of the latching mechanism is released and the arm rest 1 is in its lowered position the spring tends to urge the arm rest 1 upwardly to a raised position.

The latching mechanism 7 is disposed beneath the arm rest 1 in a position forward of the back rest 2 and attached to the arm rest at a point intermediate the longitudinal ends of said arm rest, as indicated in Figs. 1 and 2. The latching mechanism 7 comprises a pair of base members 30 and 31 in spaced relationship each having downwardly extending parallel flange members 32 and 33. The base members 30 and 31 are attached by means of a spot weld or otherwise to the arm rest 1. Both of the flange members 32 have a longitudinal slot 36 therein that extends substantially parallel to the base portion of the arm rest 1 and the flange members 33 have a slot 37 therein with its longitudinal axis normal to that of slot 36. The transverse bar 10 of the link 5 is adapted to slidably ride in the slots 36 of the flange members 32. A locking member 35 is pivotally mounted by an attached shaft 38 to the flanges 33 of the base plates 30 and 31. The shaft 38 is pivotally and slidably carried by the slots 37 in the flange members 33. The locking member 35 is fixedly attached to the shaft 38 and adapted to pivot about this shaft and also shift upwardly due to the shape of the slots 37 that carry the ends of the shaft 38. A leaf spring 34, having its end portions abutting the roof of the locking member 35 at two points, as indicated in Fig. 3, is adapted to maintain the locking member 35 downwardly in a locking position. Securing means such as the rivets 39 and 40 hold the spring 34 to the base plate of the arm rest 1. The locking member 35 is provided with locking means 41 and 42 that consist of circular portions cut out from a pair of downwardly extending flanges that are integral with the locking member 35. These locking means 41 and 42 are adapted to maintain and restrict movement of the transverse bar 10 of the link 5 when the bar is in either of the extreme positions of the slot 36, as shown in Fig. 3. A handle 43 is attached by screws 43' to a tongue portion 44 that extends downwardly and then outwardly from the locking member 35. Movement of the handle 43 upwardly or downwardly causes the locking member 35 to pivot about the shaft 38 and also shift upwardly, and thereby free the bar 10 from the locking means 41 or 42.

The operation of the latching mechanism is as follows. Assuming the arm rest 1 is in its raised position as indicated by the dash lines in Fig. 1, the transverse portion 10 of the link 5 is housed in the rearward extremity of the slot 36. This position of the transverse bar 10 in relation to the latching mechanism can be seen more clearly in Figure 3. In this position the locking means 41 of the locking member 35 maintains transverse bar 10 in a locked status due to the downward force being exerted by the spring 34 on the locking member 35. To lower the arm rest 1, the handle 8 is depressed downwardly, thereby causing the attached locking member 35 to pivot about the shaft 38 and at the same time free the bar 10 from the locking means 41. Subsequent lowering of the arm rest 1 by the occupant will cause the transverse bar 10 to ride forwardly within the slot 36, and at the same time urge the locking member 35 upwardly. The upward movement of the locking member is permitted due to the shaft 38 being carried by the slots 37. When the transverse bar 10 reaches the forward extremity of the slot 36, the locking member 35 will return to its lowered position due to the opening provided by the locking means 41 thereby locking the transverse bar 10 in this position. At this time, the arm rest 3 will be in its fully lowered position, as indicated in Fig. 1. To raise the arm rest from the lowered position the handle 8 is raised upwardly, thereby once again pivoting the locking member 35 about its pivot shaft 38 with consequent release of the locking means 41. The torsion springs 28 and 29 will tend to separate the legs of the links 4 and 5 causing the arm rest 1 to rise and the transverse bar 10 to slide rearwardly within the slot 36 until it reaches the opposite extreme portion thereof. The locking means 42 will once again lock the bar 10 in this position and the arm rest 1 will be fully raised.

It is obvious that various changes may be made in details within the scope of my claims without departing from the spirit of my invention. It is, therefore, to be understood that my invention is not to be limited to the specific details shown and described.

What I claim is:

1. In an arm rest movable between two positions and having a plurality of collapsible supporting links, one of said links having a first portion extending substantially longitudinally of said arm rest and having a second portion extending substantially transverse of said arm rest, a latching mechanism comprising a plurality of base plates in spaced relationship attached to said arm rest, a locking member having locking means formed at the extreme ends thereof, said locking member slidably and pivotally supported by said base plates at a point intermediate said locking means and movable from a locked to an unlocked position, a spring for maintaining said locking member in said locked position, means in said base plates for slidably supporting the second portion of said one of said collapsible links, said locking means adapted to lock said second portion of said one link to prevent sliding movement thereof when said arm rest is in either of said two positions, means for releasing said locking means, said means adapted to release said locking means upon movement of said means in a direction that coincides with the desired movement of said arm rest.

2. In an adjustable arm rest supported by a plurality of collapsible links having first portions substantially longitudinal of said arm rest and second portions substantially transverse of said arm rest, a latching mechanism disposed beneath said arm rest, said latching mechanism comprising a pair of spaced base plates, each of said base plates having first and second members extending towards said collapsible links, said first members of said base plates having means for slidably carrying said second portion of one of said collapsible links, a locking member interposed between said base plates, a manually operable handle attached to said locking member, locking means at the ends of said locking member, said locking member pivotally and slidably connected to said second members of said base plates at a point intermediate said locking means, said locking member engaging said second portion of said one of said collapsible links, a spring biasing said locking member into locking engagement with said second portion of said one of said collapsible links when said arm rest is in a raised or lowered position, said handle adapted to release said locking means upon movement of said handle in a direction that coincides with the desired movement of said arm rest.

3. In an arm rest movable between a raised and lowered position, a plurality of collapsible links supporting said arm rest, means continuously urging said arm rest to said raised position, one of said links having a first portion extending substantially longitudinally of said arm rest and having a second portion extending substantially transverse of said arm rest, a latching mechanism attached to said arm rest, said latching mechanism comprising a pair of spaced base plates, said base plates having first slots for slidably carrying said second portion of said one of said collapsible links, a locking member interposed between said base plates, said locking member having locking means at the extreme ends thereof, said locking member pivotally and slidably carried by second slots formed in said base plates at a point intermediate said locking means, a spring biasing said locking member to engage and restrict from movement said second portion of said one of said collapsible links when said arm rest is in either of said positions, means for releasing said locking means, said means adapted to release said locking means upon movement of said means in a direction that coincides with the desired movement of said arm rest.

References Cited in the file of this patent

UNITED STATES PATENTS

| | | |
|---|---|---|
| 1,852,465 | Mackey et al. | Apr. 5, 1932 |
| 2,291,392 | Krakauer | July 28, 1942 |
| 2,506,156 | Long | May 2, 1950 |